April 14, 1970 R. M. FEY 3,506,101

CLUTCH COOLING STRUCTURE

Filed April 22, 1968

INVENTOR.
ROBERT M. FEY
BY Radford M. Reams
HIS ATTORNEY

# United States Patent Office 3,506,101
Patented Apr. 14, 1970

3,506,101
CLUTCH COOLING STRUCTURE
Robert M. Fey, Louisville, Ky., assignor to General Electric Company, a corporation of New York
Filed Apr. 22, 1968, Ser. No. 723,087
Int. Cl. F16d 27/04, 13/72
U.S. Cl. 192—84      4 Claims

ABSTRACT OF THE DISCLOSURE

In a clutch having a rotary input structure and a rotary output structure, the input structure includes an inner radially extending wall; with an inner axially extending wall and an outer axially extending wall joined by an outer radially extending wall forming an annular recess outwardly of the inner radially extending wall to receive a clutch actuating coil. The edge of the outer axially extending wall forms a clutching surface. The output structure is provided with an annular strip of friction material for engaging the clutching surface. The strip defines a number of radial slots extending across the clutching surface to provide paths therebetween. The inner radially extending wall includes a plurality of radially extending vanes and a plurality of openings through the wall between adjacent ones of the vanes. Also the inner axially extending wall may provide a contact surface for engagement by a drive structure.

BACKGROUND OF THE INVENTION

This invention relates to clutches and more particularly to electro-magnetic clutches. In such devices an input and an output structure are mounted in juxtaposition and a coil is mounted to induce a magnetic field in the structures, which draws them together with a force dependent upon the signal applied to the coil. The relative slippage between the structures, and thus the torque or speed delivered, is varied by varying the signal to the coil. At least one of the structures is provided with a friction lining which is in essentially continuous rubbing engagement with the other structure. This generates wear particles which, if allowed to build up, can have a deleterious effect on the clutch operation. Also, both the clutching surfaces and the coil develop heat which, if not dissipated, can adversely effect the clutch operation.

An object of this invention is to provide a clutch having an improved arrangement for expelling wear particles.

Another object of this invention is to provide an improved clutch which enhances air flow therethrough;

A further object of this invention is to provide such an improved clutch having optimum torque transmitting and heating characteristics.

SUMMARY OF THE INVENTION

A clutch is provided with a rotary input structure and an adjacent rotary output structure. One of the structures includes an annular clutching surface formed adjacent the periphery thereof. The other structure is provided with an annular strip of friction material for engagement with the clutching surface. The strip is provided with a plurality of spaced, radial slots extending at least across the clutching surface to provide paths therebetween. Also, one of the structures may be provided with radial vanes and openings therebetween to enhance air flow through the clutch.

DESCRIPTION OF THE PREFERRED EMBODIMENT

Figure 1:
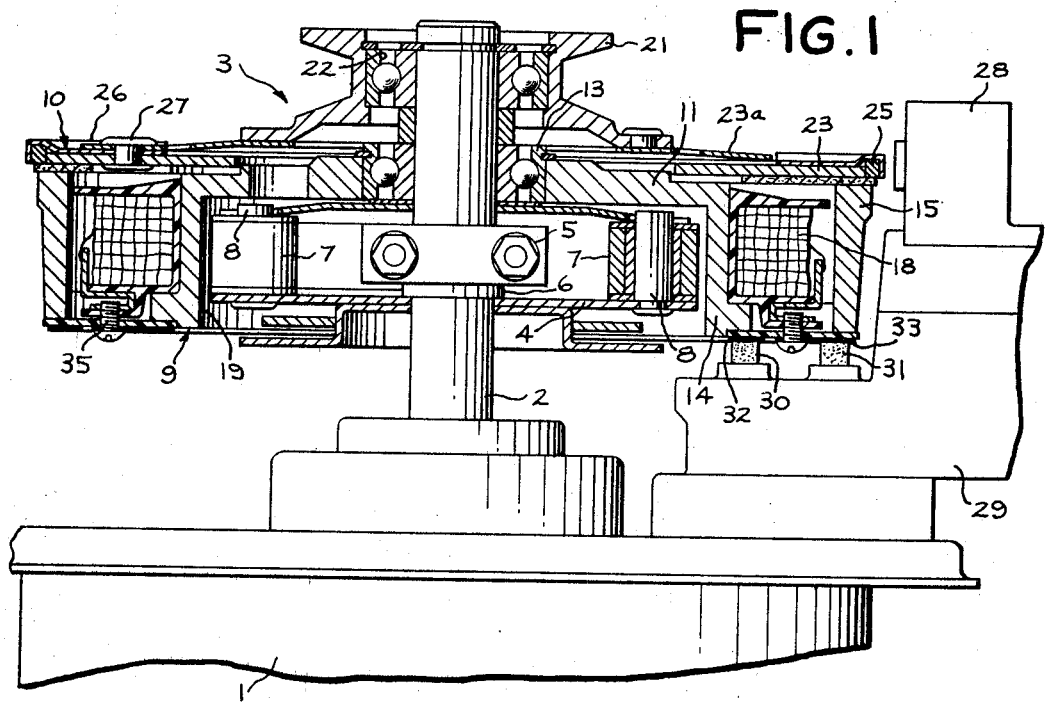
FIGURE 1 is a fragmentary side elevational view of a clutch in accordance with one form of the present invention, the mechanism being shown in section to illustrate details.

Referring now to the drawing, particularly FIGURE 1, there is shown a clutch incorporating one embodiment of the present invention and designed for use with a mechanism such as an automatic washing machine, wherein it is desirable for the drive motor of the machine to come up to speed before the clutch is effective to connect it to the load. There is shown a suitable drive source, such as a motor 1, having an output shaft 2 on which is mounted a clutch mechanism generally indicated at 3. The clutch mechanism includes a carrier plate or drive member 4 which is attached to the output shaft 2 for rotation therewith. The drive member 4 comprises a generally radially extending, oblong member which may be secured to the shaft 2 in any suitable manner, and is shown in FIGURE 1 as being secured to the shaft by means of a clamp 5. Specifically the drive member 4 is provided with an axially extending hub 6 and the clamp 5 clamps the hub 6 securely to the shaft 2.

The drive member 4 has mounted on it a pair of speed responsive or centrifugally operated clutch shoes 7 which are pivotally mounted on the drive member 4 by pins 8 so that the clutch shoes pivot outwardly as the output shaft, and thus the drive member, comes up to the operational speed of the motor 1. As the clutch shoes move outwardly they engage an intermediate, independently rotary clutch input structure 9. This input structure, as is explained hereinafter, is effective to drive an adjacent, rotary clutch output structure 10 with a variable torque transmitting capability therebetween.

Figure 2:
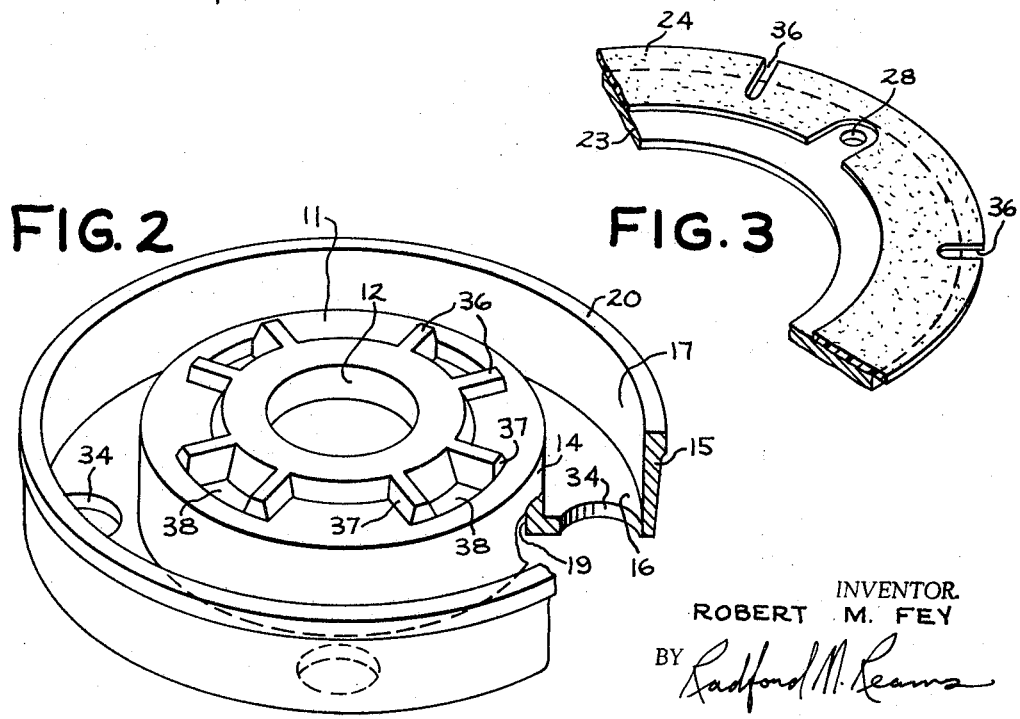
FIGURE 2 is a perspective view of a portion of the input structure of the clutch of FIGURE 1, the view being partially broken away and partially in section to illustrate details.
Figure 3:
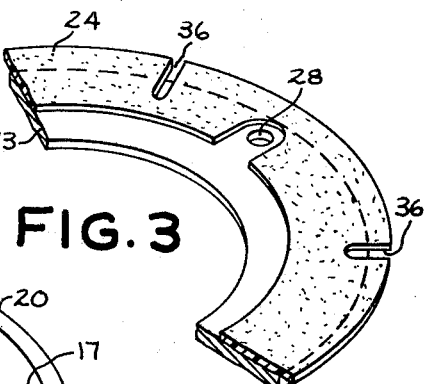
FIGURE 3 is a partial perspective view of a portion of the under side of the output structure, of the clutch of FIGURE 1, illustrating certain details thereof.

As seen in FIGURES 1 and 2 the input structure includes a first or inner, generaly radially extending wall 11 provided with a central aperture 12. A bearing structure 13 is mounted within the aperture 12 and about the output shaft 2 so that the input structure can rotate relative to the shaft. At the radially outer edge of the wall 11, the input structure is formed with an inner, axially extending wall 14. The inner, axially extending wall is joined to an outer, axially extending wall 15 by an outer, radially extending wall 16, which is axially offset from the inner, radial wall 11. Thus the walls 14, 15 and 16 form an annular recess or cavity 17 to receive an electromagnetic actuating coil structure, generally indicated at 18. Also, the radially inner surface 19 of the wall 14 forms a contact surface for engagement by the clutch shoes 7 so that, as the drive member 4 is brought up to speed by the output shaft, the clutch shoes will engage the wall 19 and drive the input structure 9 at motor speed. The edge of the outer, axial wall 15 forms a clutching surface 20 for cooperation with the output structure 10.

The output structure can be connected to drive any suitable mechanism and, for purposes of illustration, it is shown as including an output pulley or hub 21 mounted on the output shaft 2 by means of a bearing structure 22 so that it can rotate relative to the shaft. The output structure also includes an outer, annular clutching member 23 which is mounted in juxtaposition to the clutching surface 20 of the input structure and is connected to the hub 21 by an intermediate member 23a.

The clutching member 23 is provided with an annular strip of friction material 24 for engaging the clutching surface 20.

With the structure as thus far described, when the actuating coil 18 is energized, a magnetic field is established between the input and output structures. This field causes the clutching member 23 to be attracted toward the input structure 9 and the strip of friction material 24 to be pressed against the clutching surface 20. The input structure then drives the output structure and tends to rotate it at the speed of the motor 1. The torque capability between the input and output structures and thus the speed at which the clutch will drive any particular load, up to full motor speed, can be varied by varying the signal to the coil 18, as is well known in the art.

In FIGURE 1 there is illustrated one suitable means for generating a signal responsive to the speed of the output portion for controlling the signal to the coil 18 to provide a predetermined output speed. A strip of magnetic material 25 is mounted around the outer edge of the clutching member 23 by means of an annular connector 26 which fits around the strip 25 and holds it securely against the edge of the clutching member 23. The connector in turn is attached to the clutching member 23 by any suitable means such as a number of rivets 27, which extend through appropriate openings 28 in the clutching member and through openings in the connector 26 and the intermediate member 24 so as to securely connect these members together.

The magnetic strip 25 is provided around its circumference with alternate north and south poles. As the output structure rotates the alternate poles are rotated past a tachometer pickup or generator generally indicated at 28. The signal from the tachometer generator is fed to a control generally indicated at 29, which develops a control signal that is applied between a pair of brushes 30 and 31. The brushes bear against a pair of slip rings 32 and 33, which are mounted under the radial wall 16. Leads from the coil 18 extend through suitable openings 34 in the wall 16 and are connected to the slip rings 32 and 33 so that the signal applied across the brushes 30 and 31 is applied to the coil 18. These same openings 34 serve as a suitable means for fixedly attaching the coil 18 in the recess 17 by any suitable means such as the screws shown at 35 which also form part of the leads for the coil. The particular tachometer generator and control to generate the signal applied to the brushes forms no part of this invention and there are a number of such controls well known in the art. Therefore, no details of these particular elements have been shown.

As thus far described the clutch mechanism is effective to drive the output structure at a predetermined torque level. In electro-magnetic clutches there is quite often a substantial relative rubbing movement between the input and the output structures. This generates a fair amount of wear particles due to the rubbing together of these members. Additionally, other contaminants, such as dust, tend to find their way into the clutch mechanisms. If these contaminants build up, particularly around the actuating coil, they can cause erratic operation or failure of the clutch. Also, both the contact between the clutching surfaces and energization of the actuating coil generate heat which must be dissipated for proper continued operation of the clutch.

As an important aspect of this invention means are provided for alleviating these problems and providing other important advantages. As one important aspect of this invention the strip of friction material 24 defines a number of radial slots 36 which extend at least across the clutching surface 20. With this arrangement, even when the clutching surface 20 and friction material 24 are pressed tightly together, there are formed a number of paths between these elements. These slots are spaced around the circumference of the clutch mechanism so that wear particles and other contaminants have a number of paths for escaping out of the clutch. These slots or openings also provide paths whereby air may flow outwardly between these two members during clutch operation. This not only assists in carrying away the contaminants; it also enhances heat dissipation from the clutch.

As another aspect of this invention the inner, radially extending wall 11 of the input structure is provided with a plurality of radial vanes 37. As the input member rotates, movement of these vanes enhances the air flow between the input and output clutch structures for flow outwardly through the openings provided by the slot 36. Also a number of openings, such as those shown at 38, are provided between adjacent ones of the vanes. These complete a path extending axially by the drive member 4, through the openings 38 and then radially outwardly between the input and the output structures. Thus air is free to flow through the clutch to assist in heat dissipation and the carrying away of contaminant particles, even when the clutch is delivering maximum torque.

Also with the arrangement shown the clutching surface 20 may be provided with a relatively narrow width. Since it is formed at the radially outward portion of the clutch, maximum torque will be delivered with the minimum surface area.

The clutch mechanism illustrated in FIGURE 1 includes a separate drive member for causing the clutch to be rotated only after the drive motor has come up to speed, as is desirable in many applications such as automatic washing machines where the initial load is relatively high compared to the starting torque capability of the motors which are normally used. In such applications it is desirable to have the motor come up to speed before the load is connected to it. In other applications, where there is no such requirement, obviously the input structure could be directly attached to the drive member. One such approach would be by keying the radially inner wall of the input structure to the drive shaft of the motor. With such an arrangement, the input structure continuously rotates at motor speed.

What I claim as new and desire to secure by Letters Patent of the United States is:

1. A clutch including:
   (a) a rotary input structure including a raised central portion, an annular recessed portion surrounding said raised portion to receive a clutch actuating coil, and an axially extending, annular outer wall; the edge of said outer wall being formed as an annular clutching surface;
   (b) a rotary output structure axially adjacent said input structure;
   (c) said output structure being provided with an annular strip of friction material for engagement with said clutching surface, said strip being provided with a plurality of spaced, radial slots extending at least across said clutching surface to provide paths therebetween;
   (d) said central portion of said input structure including a plurality of radial vanes for enhancing air flow through said slots during operation of said clutch; and
   (e) said central portion defining a plurality of openings therethrough between adjacent ones of said vanes.

2. A clutch including:
   (a) a rotary input structure including a raised central portion, an annular recessed portion surrounding said raised portion to receive a clutch actuating coil, and an axially extending, annular outer wall; the edge of said outer wall being formed as an annular clutching surface;
   (b) a rotary output structure axially adjacent said input structure;
   (c) said output structure being provided with an annular strip of friction material for engagement with said clutching surface, said strip being provided with a plurality of spaced, radial slots extending at least across said clutching surface to provide paths therebetween;

(d) said input structure comprising a unitary member including an inner radially extending wall, forming said central portion; an inner and said outer axially extending wall, joined by an outer radially extending wall, offset with respect to said inner radially extending wall, to form said annular recess;

(e) said inner radially extending wall having formed thereon a plurality of spaced radial vanes and a plurality of spaced openings through said inner radially extending wall disposed between adjacent ones of said vanes.

3. The invention as set forth in claim 2 wherein said inner axially extending wall provides a contact surface for engagement by a driving structure to rotate said input structure.

4. A clutch including:
(a) a rotary input structure including a raised central portion, an annular recessed portion surrounding said raised portion to receive a clutch actuating coil, and an axially extending, annular outer wall; the edge of said outer wall being formed as a first annular surface;
(b) a rotary output structure axially adjacent said input structure and having a second annular surface adjacent said first annular surface;
(c) one of said annular surfaces comprising a clutching surface, the other annular surface being provided with an annular strip of friction material for engagement with said clutching surface, said strip being provided with a plurality of spaced, radial slots extending at least across said clutching surface to provide paths therebetween;
(d) said central portion of said input structure including a plurality of radial vanes for enhancing air flow through said slots during operation of said clutch; and
(e) said central portion defining a plurality of openings therethrough between adjacent ones of said vanes.

References Cited
UNITED STATES PATENTS

| | | | |
|---|---|---|---|
| 1,513,203 | 10/1924 | Wemp | 192—113 |
| 2,107,954 | 2/1938 | Morton et al. | 192—113 |
| 2,348,025 | 5/1944 | Peets et al. | 192—113 |
| 2,920,726 | 1/1960 | Maurice et al. | 192—84 |
| 3,162,285 | 12/1964 | Sala | 192—84 |

MARK M. NEWMAN, Primary Examiner

A. D. HERRMANN, Assistant Examiner

U.S. Cl. X.R.

192—48.2, 113